United States Patent
Benny et al.

(10) Patent No.: US 8,798,052 B2
(45) Date of Patent: Aug. 5, 2014

(54) RELAYING FRAMES IN A LARGE LAYER 2 NETWORK FABRIC

(75) Inventors: Stephan Benny, Sunnyvale, CA (US); Keshav Govind Kamble, Fremont, CA (US); Dar-Ren Leu, San Jose, CA (US); Vijoy A. Pandey, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 13/585,859

(22) Filed: Aug. 15, 2012

(65) Prior Publication Data

US 2014/0050216 A1   Feb. 20, 2014

(51) Int. Cl.
*H04L 12/26* (2006.01)

(52) U.S. Cl.
USPC .......................................... 370/389

(58) Field of Classification Search
USPC ......... 370/390, 401, 400, 432, 466, 469, 467, 370/470, 471, 474
See application file for complete search history.

(56) References Cited

U.S. PATENT DOCUMENTS

| | | | |
|---|---|---|---|
| 5,742,604 A | 4/1998 | Edsall et al. | |
| 7,535,893 B1 * | 5/2009 | Beladakere et al. | 370/353 |
| 7,573,879 B2 * | 8/2009 | Narad et al. | 370/392 |
| 7,664,116 B2 | 2/2010 | Shimizu | |
| 7,778,255 B2 | 8/2010 | Yazaki | |
| 7,821,972 B1 | 10/2010 | Finn et al. | |
| 2007/0286233 A1 | 12/2007 | Latif et al. | |
| 2010/0165995 A1 | 7/2010 | Mehta et al. | |

OTHER PUBLICATIONS

Chiruvolu et al, "Issues and Approaches on Extending Ethernet Beyond LANs", Communications Magazine, IEEE, vol. 42, No. 3, Mar. 2004, pp. 80-86.
Metz, C., "Layer 2 Over IP/MPLS", Internet Computing, IEEE, vol. 5, No. 4, Jul./Aug. 2001, pp. 77-82.
Martini et al, "Encapsulation Methods for Transport of Layer 2 Frames over MPLS Networks", IP.com, Jun. 2007, 22 pages.
U.S. Appl. No. 13/364,896, filed Feb. 2, 2012 in the USPTO; 32 pages.

* cited by examiner

*Primary Examiner* — Chi Pham
*Assistant Examiner* — Alexander O Boakye
(74) *Attorney, Agent, or Firm* — Schmeiser, Olsen & Watts LLP; Michael A. Rodriguez

(57) ABSTRACT

A network fabric includes interconnected network nodes, each having access to a database containing predetermined paths from each network node to each other network node in the network fabric. Each network node determines, in response to an incoming frame, whether the frame is a fabric protocol data unit (PDU) having a header containing path attributes including a destination node address. If the frame is a fabric PDU, the node selects a first path to the destination node from the database, and forwards the fabric PDU to a next hop in accordance with the selected path. If the frame is not a fabric PDU, the node selects a second path through the network fabric to the destination node from the database, adds the header with the path attributes to the frame to produce the fabric PDU, and forwards the fabric PDU to the next hop in accordance with the second path.

15 Claims, 6 Drawing Sheets

RELAYING FRAMES IN A LARGE LAYER 2 NETWORK FABRIC

FIELD OF THE INVENTION

The invention relates generally to networks and data processing. More particularly, the invention relates to a mechanism for relaying frames in a layer-2 network fabric comprised of distributed interconnected network nodes.

BACKGROUND

Data centers are generally centralized facilities that provide Internet and intranet services needed to support businesses and organizations. A typical data center can house various types of electronic equipment, such as computers, servers (e.g., email servers, proxy servers, and DNS servers), switches, routers, data storage devices, and other associated components. Network fabrics within a data center can have hundreds, even thousands of nodes. Moreover, nodes can dynamically join or leave a network fabric. The technique used by the network fabric to relaying frames can be instrumental to its scalability, that is, the ability to grow the size of the data center, in addition to its ability to recover from dynamic changes to the node membership of the network fabric.

SUMMARY

In one aspect, the invention features a network fabric comprising a plurality of interconnected network nodes. Each network node has access to a database containing predetermined paths from each network node in the network fabric to each other network node in the network fabric. Each network node has a Layer 2 switching fabric and a processor configured to determine, in response to an incoming frame, whether the frame is a fabric protocol data unit (PDU) having a header with path attributes that include an address of a destination network node in the network fabric. If the frame is a fabric PDU, the processor is configured to select a first path to the destination network node from a database of predetermined paths, and to direct the switching fabric to forward the fabric PDU to a next hop in accordance with the selected first path. Otherwise, if the frame is not a fabric PDU, the processor is configured to select a second path through the network fabric to the destination network node from the database of predetermined paths, to add the header with the path attributes to the frame to produce the fabric PDU, and to direct the switching fabric to forward the fabric PDU to the next hop in accordance with the selected second path.

In another aspect, the invention features a network node comprising a Layer 2 switching fabric receiving an incoming frame, memory storing program code for processing the incoming frame, and a processor, in response to executing the program code stored in the memory, determining whether the frame is a fabric protocol data unit (PDU) having a header containing path attributes that include an address of a destination network node. If the frame is a fabric PDU, the processor is configured to select a first path to the destination network node from a database of predetermined paths, and to direct the switching fabric to forward the fabric PDU to a next hop in accordance with the selected first path. Otherwise, if the frame is not a fabric PDU, the processor is configured to select a second path through the network fabric to the destination network node from the database of predetermined paths, to add the header with the path attributes to the frame to produce the fabric PDU, and to direct the switch fabric to forward the fabric PDU to the next hop in accordance with the selected second path.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
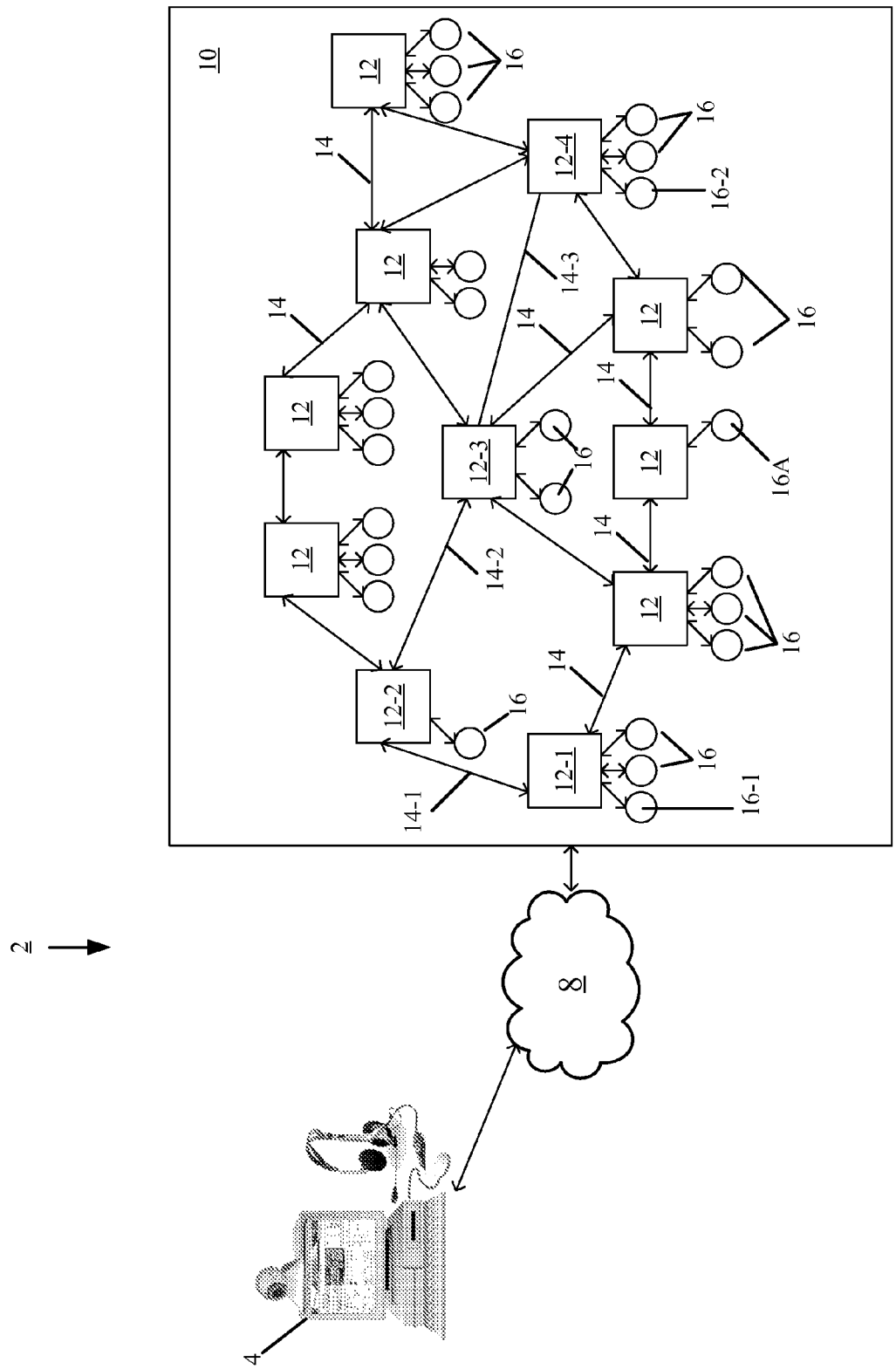
FIG. 1 is an embodiment of a network including a data center or network enterprise with a network fabric comprised of a plurality of interconnected network nodes.

Large layer-2 network fabrics described herein comprise numerous network nodes interconnected in any configuration, including full mesh (in which every node is connected to every other node) and partial mesh connectivity. The network nodes can be connected to end systems. Logic running within the network fabric builds a database of predetermined paths through the network fabric from each potential source node to each potential destination node. A path through the network fabric is a series of hops and the communication links between such hops. A variety of protocols can be used to build the database of predetermined paths, for example, any link layer routing protocol. Examples of applicable link layer protocols include, but are not limited to, Address Resolution Protocol (ARP) and Media Access Control (MAC). The logic operates continuously or periodically, and dynamically detects changes in the paths in the network fabric caused by network nodes joining and leaving the network fabric, or upon changes in the status of the communication links (e.g., down, up, congested). One implementation of such logic is described in U.S. patent application Ser. No. 13/364,896, titled "Distributed Fabric Management Protocol", the entirety of which application is incorporated by reference herein. Each network node can execute this logic, or the logic can be centralized at a computing entity, such as a server or a dedicated one of the network nodes, accessible to each of the network nodes for purposes of acquiring a predetermined path from the database.

In brief overview, each network node that is part of a predetermined path through the network fabric is either a source node, an intermediate node, or a destination node. To relay a frame through the network fabric, logic, executing at a source node or at a source end system connected to the source node, accesses the database to select a predetermined path extending from the source node to a destination node, adds a header to the frame that includes a path attribute reflecting the selected path, and forwards the modified frame, referred to as a fabric PDU, to the next hop. For a multicast frame, the logic copies the multicast frame, and converts each copy of the frame into a (unicast) fabric PDU by selecting a predetermined path for each copy and adding to that copy path attributes corresponding to the selected predetermined path.

An intermediate node in the path receives the fabric PDU, obtains the address of the destination node from the path attributes in the fabric PDU, selects a predetermined path from the database based on the destination node in the path attributes, identifies the next hop from the selected predetermined path, and forwards the fabric PDU to the next hop in accordance with the selected path.

In response to receiving a fabric PDU, a destination network node obtains the destination node address from the path attributes in the fabric PDU, determines that the fabric PDU has reached its destination node, optionally removes the path attributes from the fabric PDU to restore the original frame, and forwards the original frame (or, in the instance where the path attributes are not removed, the fabric PDU) to the destination end system. To determine which end system(s) is/are the destination of the frame, the network node examines the destination address within the original frame. In those embodiments in which the destination network node does not remove the path attributes from the fabric PDU, the destination end system can be configured to perform this task.

Advantageously, frame relay based on path attributes facilitates scaling and self-healing formation of a flexible layer-2 network fabric. Network nodes can be added or removed seamlessly, which helps alleviate the burden for administrative configuration, especially as services move into the network fabric. Further, the frame relay dispenses with any concern of the formation of loops in the connectivity of the layer-2 network fabric.

FIG. 1 is an embodiment of a networking environment 2 including a network enterprise or data center 10 in communication with a management station 4 over a network 8. Embodiments of the network 8 include, but are not limited to, local-area networks (LAN), metro-area networks (MAN), and wide-area networks (WAN), such as the Internet or World Wide Web. In one embodiment, the network 8 is configured as an Layer 2 (L2) VLAN. The data center 10 may be embodied at a single site or distributed among multiple sites. Although shown outside of the data center 10, the management station 4 may be considered part of the data center 10. The data center 10 is generally a facility that houses various computers, routers, switches, and other associated equipment in support of applications and data that are integral to the operation of a business, organization, or other entities.

The data center 10 includes a network fabric comprised of a plurality of network nodes 12 interconnected by communication links 14 (a representative sample of which are labeled). The network nodes 12 are configured together to be members of a particular group (or cluster). The data center 10 can have more than one group (or cluster), although each network node 12 can be the member of one group only. Members of the same group can share the same group ID (GID). Embodiments of the network nodes 12 include, but are not limited to, core switches, access switches, fabric cards, line cards, and management modules in a physical chassis switch. The number of network nodes 12 in the network fabric can range in the hundreds or thousands. Example embodiments of the data center 10 include a Layer 2 (L2) VLAN and an Ethernet LAN.

Coupled to each of the network nodes 12 is one or more end systems 16. In general, an end system 16 is a computing system, examples of which include, but are not limited to, servers and network appliances. In general, a server is a computer (or group of computers) that provides one or more services to the data center 10, examples of which include, but are not limited to, email servers, proxy servers, DNS servers, and a central control server running the control plane of the network fabric or maintaining a database of predetermined paths, as described in more detail below. For purposes of later illustration, the end system 16A can be considered an example of such a central control server.

Figure 2:
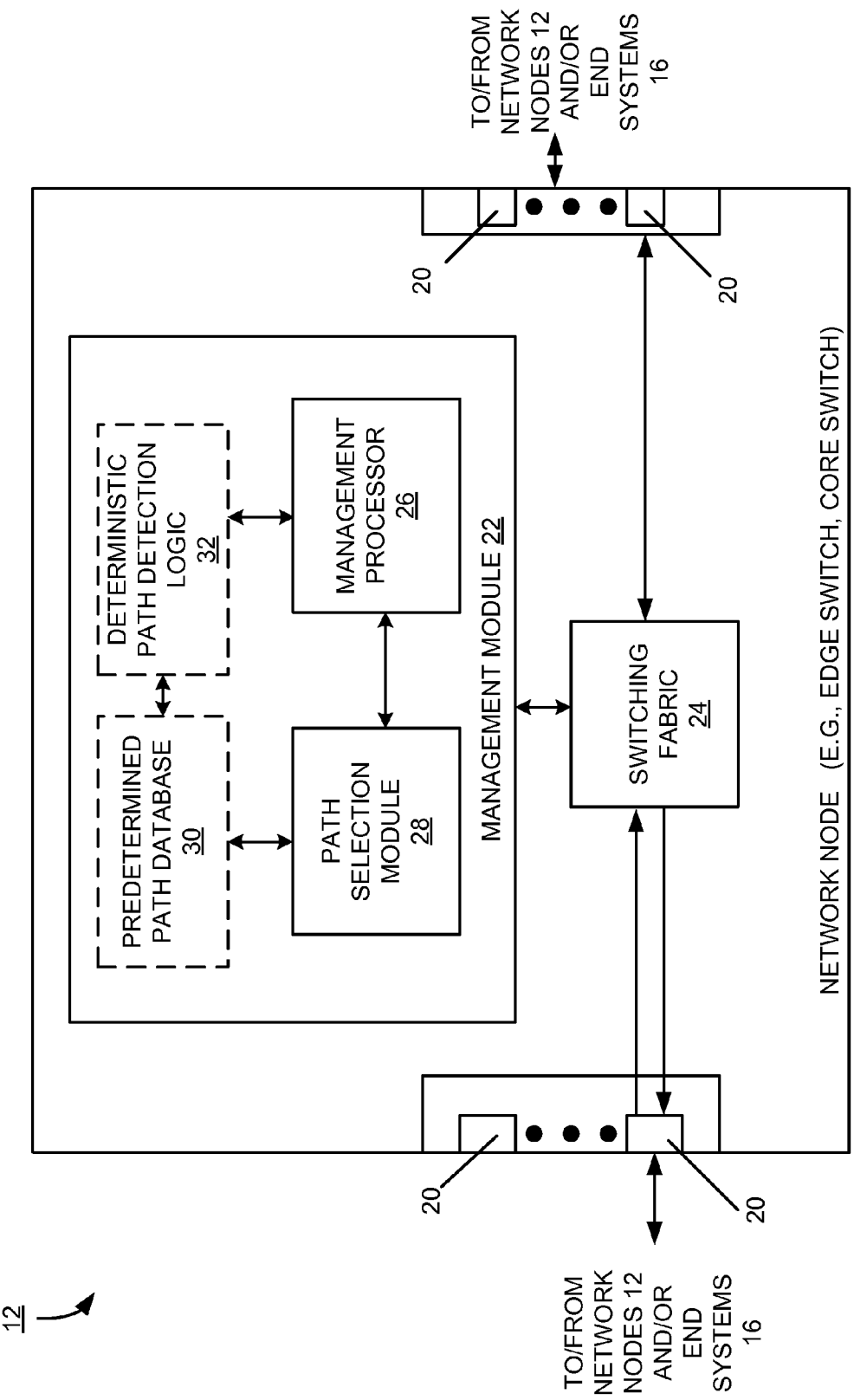
FIG. 2 is a functional diagram of an embodiment of a network node.

FIG. 2 is a functional diagram of an embodiment of a network node 12, including a plurality of ports 20 for connecting to other network nodes 12 and end systems 16. The network node 12 further includes a management module 22 in communication with a switching fabric 24 for switching data units between the physical ports. The management module 22 of the network node 12 is in communication with the switching fabric 24 to determine the frame-relay behavior of the switching fabric 24, as described herein.

The switching fabric 24 can be implemented as an OSI Layer 2 switch that applies traffic handling policies to traffic switching between physical ports 20. The switching fabric 24 can be embodied in a custom semiconductor integrated circuit (IC), such as an application-specific integrated circuit (ASIC), application specific standard product (ASSP), or field-programmable gate array (FPGA) semiconductor device. Although shown as separate from the switching fabric 24, the management module 22 can be implemented within the ASIC or FPGA of the switching fabric 24.

The management module 22 includes a management processor 26 that communicates with a path selection module 28. The path selection module 28 is a software program or firmware (or a combination thereof) stored in memory (not shown) and executed by the management processor 26 to select a path for a received frame (or fabric PDU). To select a path, the path selection module 28 is in communication with a predetermined path database 30, which may reside locally at the network node 12 (as shown in phantom) or remotely at a central control entity, for example, at end system 16A of FIG. 1. For purposes of redundancy, the network fabric can have more than one central control entity for purposes of generating and maintaining the predetermined path database 30.

Logic 32 for generating the predetermined path database 30 may also reside and execute locally on the network node 12 (as shown in phantom) or at the central control entity. In general, the logic 32 uses a link layer protocol (e.g., Ethernet) to build and dynamically maintain the predetermined path database 30, detecting when network nodes 12 join and leave the network fabric and when various links 14 come up and go down. Network nodes 12 can thus be added to or removed from the network fabric seamlessly, with the logic 32 detecting any changes and updating the predetermined path database 30 accordingly. The network fabric can thus flexibly expand (scale) and contract as deemed appropriate.

Figure 3:
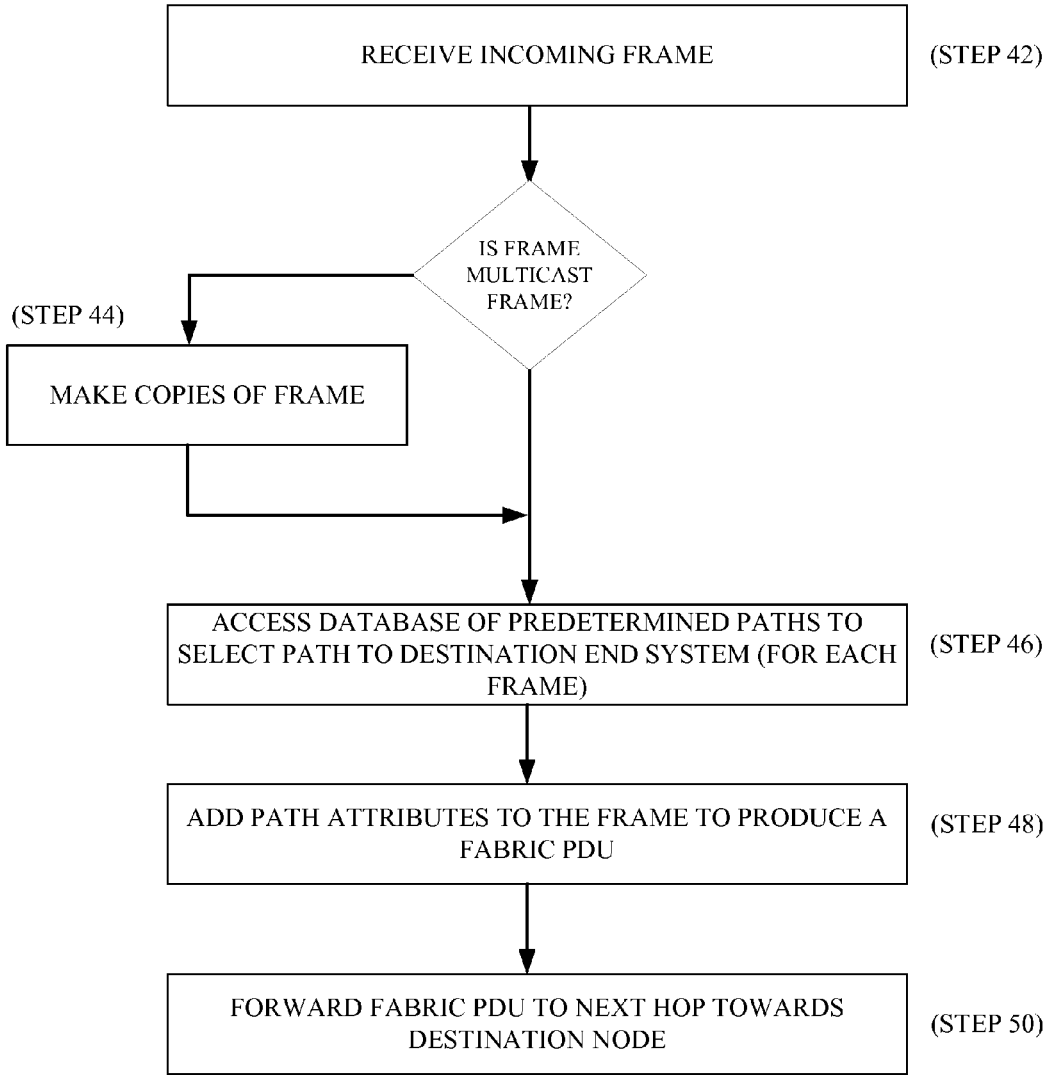
FIG. 3 is a flow diagram of an embodiment of a process for modifying a frame to produce a fabric protocol data unit (PDU) for relaying through the network fabric.

FIG. 3 shows an embodiment of a process 40 for modifying a frame to produce a fabric protocol data unit (PDU) for relaying through the network fabric. In the description of the process 40, reference is also made to features in FIG. 1 and FIG. 2. In general, the process 40 can be performed by the end system 16 sourcing the frame, for example, end system 16-1, or by the first hop on the path, for example, network node 12-1. For purposes of the following description, consider, for example, the end system 16-1 to be the source of the frame to be relayed to a destination end system 16-2 (coupled to network node 12-4), and the network node 12-1 to be the first hop to receive the frame along its path towards its destination.

At step 42, the source end system 16-1 generates the original frame. The frame can be a unicast frame, targeted to a particular destination end system (e.g., 16-2), and containing a source address of the source end system 16-1 and a destination address of a destination end system 16-2. Alternatively, the original frame can be a multicast frame targeted for broadcast distribution. If the frame is a multicast frame, copies of the frame are made (step 44) for conversion into separate unicast fabric PDUs, wherein each unicast fabric PDU carries the address of the source network node (in this example, network node 12-1) and the address of a destination network node (in this example, network node 12-4).

To produce each fabric PDU, access is made (step 46) to the database of predetermined paths 30, described in FIG. 2, in order to acquire a predetermined path. The source network node 12-1 (or the source end system 16-1) applies certain criteria, for example, shortest path first, lowest latency path, to make a path selection. In response to acquiring the determined path, path attributes are added (step 48) to the original frame to produce the fabric PDU. The path attributes include the address of the source network node (i.e., the first hop network node) and the address of the destination network node (i.e., the last hop network node). In another embodiment, the path attributes can also include the address of the next hop network node (which, unlike the source and destination network nodes, may be updated with each hop taken by the fabric PDU). The modification of the frame with path attributes can be accomplished using any proprietary or standard encapsulation mechanism (e.g., MAC-in-MAC). The encapsulation of the frame with the path attributes effectively forms a tunnel through the network fabric between the source and destination network nodes.

The first hop network node (i.e., the source network node) relays (step 50) the fabric PDU to the next hop network node, as determined by the acquired predetermined path. For example, consider that the selected path for the frame traverses from the source network node 12-1, through intermediate network nodes 12-2 and 12-3, to the destination network node 12-4. From the selected path, the source network node 12-1 determines that the next hop along the path is the intermediate node 12-2, to which the fabric PDU is sent.

Figure 4:
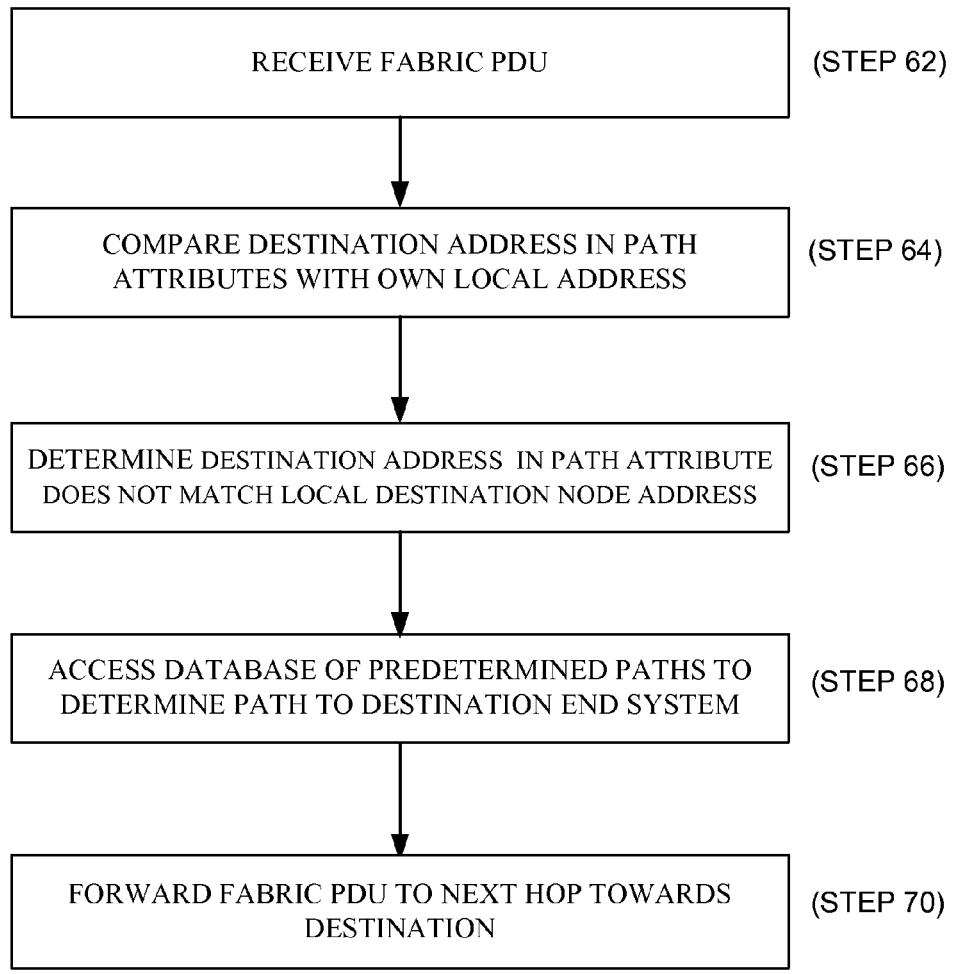
FIG. 4 is a flow diagram of an embodiment of a process by which an intermediate network node processes and relays a fabric PDU through the network fabric.

FIG. 4 is a flow diagram of an embodiment of a process 60 by which an intermediate network node processes and relays a fabric PDU through the network fabric. In the description of the process 60, reference is also made to features in FIG. 1 and FIG. 2. At step 62, an intermediate network node (e.g., 12-2 or 12-3) receives a fabric PDU. The intermediate network node examines the added encapsulation that includes the path attributes and compares (step 64) the path destination address with its local address. An intermediate network node does not find (step 66) a match (because it is not the destination). To determine the next hop to which to forward the fabric PDU, the intermediate network node accesses (step 68) the database of predetermined paths 30 to find a path to the destination network node. Like the source network node, the intermediate network node can apply certain criteria to facilitate the path selection, e.g., shortest path in terms of hops, lowest latency. Because the set of predetermined paths changes dynamically, the intermediate network node may acquire a path to the destination network node that diverges from the path acquired by the source network node or by any other preceding intermediate nodes. In this regard, the relay mechanism is self-healing; if one of the communication links 14 of the original path acquired by the source network node becomes broken, an intermediate network node acquires an operational path to the destination network node. At step 70, the intermediate network node forwards the fabric PDU to the next node in the acquired predetermined path.

Figure 5:
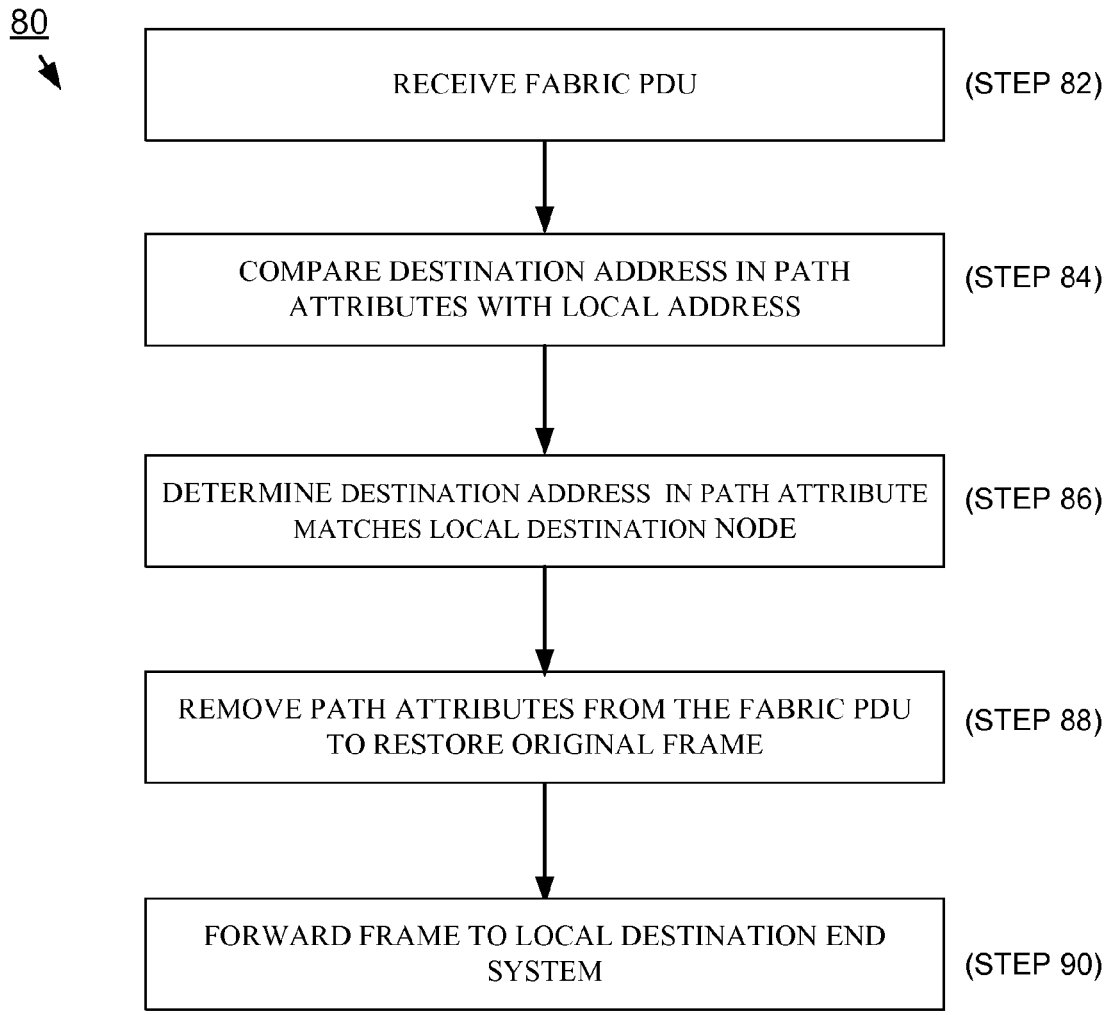
FIG. 5 is a flow diagram of an embodiment of a process by which a destination network node in the network fabric restores a fabric PDU to its original frame and forwards the frame to a destination end system.

FIG. 5 is a flow diagram of an embodiment of a process 80 by which a destination network node in the network fabric restores a fabric PDU to its original frame and forwards the frame to a destination end system. In the description of the process 80, reference is also made to features in FIG. 1 and FIG. 2. At step 82, the destination network node receives a fabric PDU. The destination network node compares (step 84) the destination address in the path attributes with it local address and finds (step 86) a match. In one embodiment, in response to the match, the destination network node removes (step 88) the encapsulation containing the path attributes to restore the original frame. The destination network node examines the original frame to obtain the destination address of a local destination end system 16-2, to which the destination network node forwards (step 90) the frame. Alternatively, in another embodiment, the destination network node can forward the fabric PDU to the destination end system 16-2 with the layer-2 encapsulation, relegating the task of removing the path attributes to the destination end system 16-2. In the instance where multiple end systems 16 are the intended targets, for example, as in the case when the original frame is a multicast frame, the destination network node 12-4 sends a copy of the original frame (or fabric PDU) to each end system 16 coupled to that destination network node.

Figure 6:
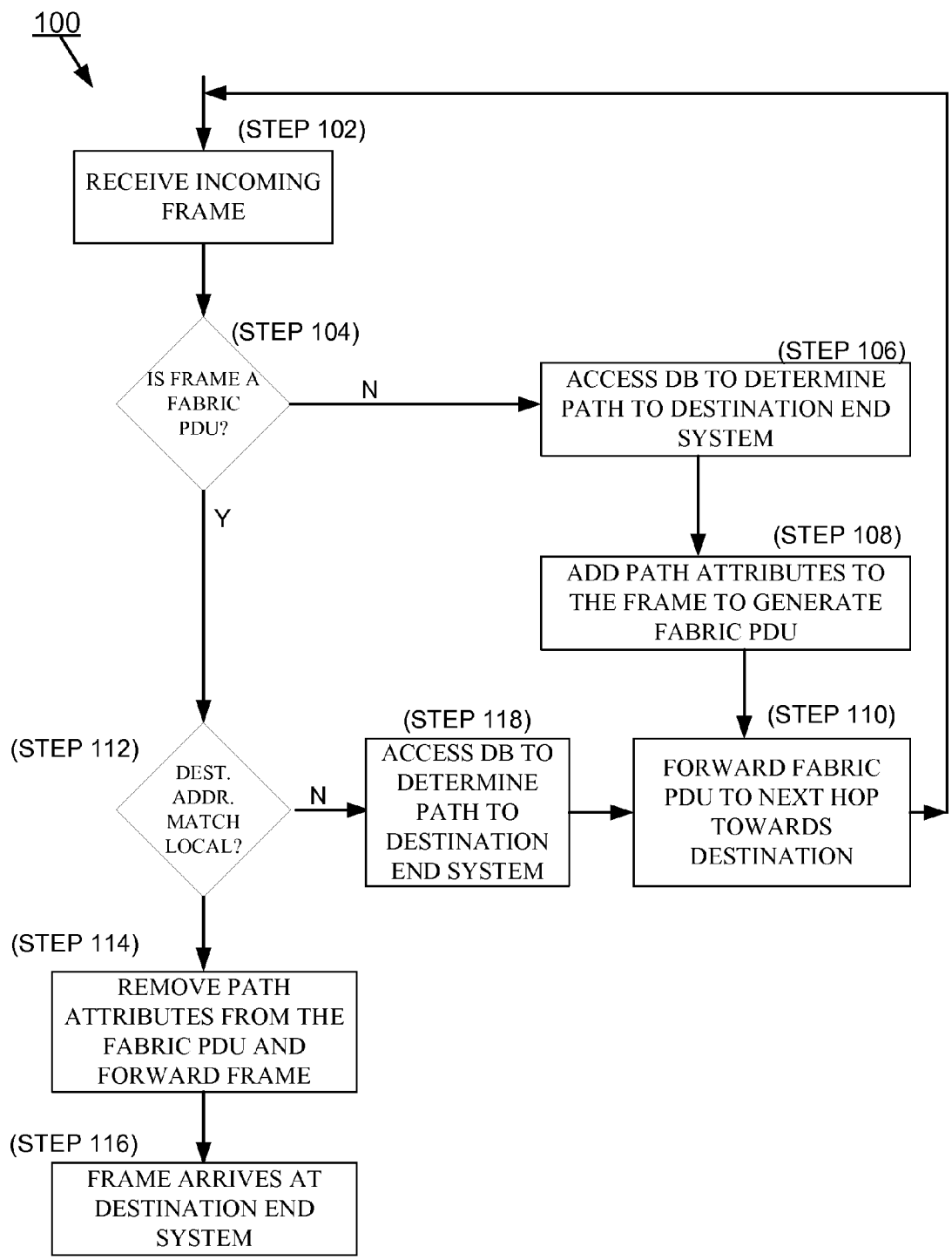
FIG. 6 is a flow diagram of an embodiment of an overall process that can be performed by each network node in the network fabric in response to receiving a frame or fabric PDU.

FIG. 6 is a flow diagram of an embodiment of an overall process 100 that can be performed by each network node 12 in the network fabric in response to receiving a frame (or fabric PDU). At step 102, the network node 12 receives a frame. The network node determines (step 104) whether the frame is a fabric PDU.

If, at step 104, the frame is not a fabric PDU, the network node accesses the database of predetermined paths and selects (step 106) a path to the destination network node. The network node adds (step 108) path attributes to the frame to generate a fabric PDU and forwards (step 110) the fabric PDU to the next hop in the path.

If instead, at step 104, the incoming frame is a fabric PDU, the network node 12 compares (step 112) the destination address of the path attributes to its local address. In response to finding a match, the network node 12 can remove (step 114) the path attributes from the fabric PDU, to produce the original frame, and forward (step 116) the frame to the destination end system. If the network node 12 does not remove the path attributes, the destination end system 16-2 performs this task in response to receiving the forwarded fabric PDU.

In response to not finding a match, the network node 12 accesses the database 30 of predetermined paths, and selects (step 118) a path to the destination network node 12-4 and forwards (step 110) the fabric PDU to the next hop in the selected path. The next hop then handles the forwarded fabric PDU in accordance with the process 100.

As will be appreciated by one skilled in the art, aspects of the present invention may be embodied as a system, method, and computer program product. Thus, aspects of the present invention may be embodied entirely in hardware, entirely in software (including, but not limited to, firmware, program code, resident software, microcode), or in a combination of hardware and software. All such embodiments may generally be referred to herein as a circuit, a module, or a system. In addition, aspects of the present invention may be in the form of a computer program product embodied in one or more computer readable media having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired, optical fiber cable, radio frequency (RF), etc. or any suitable combination thereof.

Computer program code for carrying out operations for aspects of the present invention may be written in any combination of one or more programming languages, including an object oriented programming language such as JAVA, Smalltalk, C++, and Visual C++ or the like and conventional procedural programming languages, such as the C and Pascal programming languages or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may execute entirely on a user's computer, partly on the user's computer, as a stand-alone software package, partly on the user's computer and partly on a remote computer or entirely on a remote computer or server. Any such remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Aspects of the described invention may be implemented in one or more integrated circuit (IC) chips manufactured with semiconductor-fabrication processes. The maker of the IC chips can distribute them in raw wafer form (on a single wafer with multiple unpackaged chips), as bare die, or in packaged form. When in packaged form, the IC chip is mounted in a single chip package, for example, a plastic carrier with leads affixed to a motherboard or other higher level carrier, or in a multichip package, for example, a ceramic carrier having surface and/or buried interconnections. The IC chip is then integrated with other chips, discrete circuit elements, and/or other signal processing devices as part of either an intermediate product, such as a motherboard, or of an end product. The end product can be any product that includes IC chips, ranging from electronic gaming systems and other low-end applications to advanced computer products having a display, an input device, and a central processor.

Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It is be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed.

While the invention has been shown and described with reference to specific preferred embodiments, it should be understood by those skilled in the art that various changes in form and detail may be made therein without departing from the spirit and scope of the invention as defined by the following claims.

What is claimed is:

1. A network fabric, comprising:
   a plurality of interconnected network nodes, each network node having access to a database containing predetermined paths from each network node in the network fabric to each other network node in the network fabric, each network node having a Layer 2 switching fabric and a processor configured to determine, in response to an incoming frame, whether the frame is a fabric protocol data unit (PDU) having a header with path attributes that include an address of a destination network node in the network fabric, and wherein,
   if the frame is a fabric PDU, the processor is configured to select a first path to the destination network node from a database of predetermined paths, and to direct the switching fabric to forward the fabric PDU to a next hop in accordance with the selected first path,
   otherwise, if the frame is not a fabric PDU, the processor is configured to select a second path through the network fabric to the destination network node from the database of predetermined paths, to add the header with the path attributes to the frame to produce the fabric PDU, and to direct the switching fabric to forward the fabric PDU to the next hop in accordance with the selected second path.

2. The network fabric of claim 1, further comprising logic configured to generate the database of predetermined paths.

3. The network fabric of claim 2, wherein each network node executes the logic to generate the database of predetermined paths.

4. The network fabric of claim 2, further comprising a central control entity that executes the logic to generate the database of predetermined paths.

5. The network fabric of claim 1, wherein the path attributes in the header of the frame produces a tunnel through the network fabric from a source network node to the destination network node.

6. The network fabric of claim 1, further comprising an end system coupled to one of the network nodes, wherein the end system adds the header with the path attributes to the frame to produce the fabric PDU.

7. The network fabric of claim 1, wherein the first and second paths diverge from each other at one or more communication links between a source network node and the destination network node.

8. The network fabric of claim 1, wherein the processor is further configured to convert the frame into multiple fabric PDUs if the frame is a multicast frame.

9. The network fabric of claim 1, wherein the network nodes are interconnected in a full mesh configuration.

10. The network fabric of claim 1, wherein the processor of the destination network node is configured to remove the header with the path attributes from the fabric PDU.

11. The network fabric of claim 1, further comprising an end system coupled to the destination network node, and wherein the processor of the destination network node is configured to direct the switching fabric of the destination network node to forward the fabric PDU to the end system, and the end system is configured to remove the header with the path attributes from the fabric PDU to restore the frame.

12. A network node, comprising:
    a Layer 2 switching fabric receiving an incoming frame;
    memory storing program code for processing the incoming frame; and
    a processor, in response to executing the program code stored in the memory, determining whether the frame is a fabric protocol data unit (PDU) having a header containing path attributes that include an address of a destination network node, wherein,
    if the frame is a fabric PDU, the processor is configured to select a first path to the destination network node from a database of predetermined paths, and to direct the switching fabric to forward the fabric PDU to a next hop in accordance with the selected first path,
    otherwise, if the frame is not a fabric PDU, the processor is configured to select a second path through the network fabric to the destination network node from the database of predetermined paths, to add the header with the path attributes to the frame to produce the fabric PDU, and to direct the switching fabric to forward the fabric PDU to the next hop in accordance with the selected second path.

13. The network node of claim 12, wherein the processor, in response to executing the program code stored in memory, generates and maintains the database of predetermined paths.

14. The network node of claim 12, wherein the processor, in response to executing the program code stored in memory, converts the incoming frame into multiple fabric PDUs if the incoming frame is a multicast frame.

15. The network node of claim 12, wherein the processor, in response to executing the program code stored in memory, removes the header with the path attributes from the fabric PDU to restore the frame and forwards the frame to a destination end system coupled to the network node.

* * * * *